US010663362B2

United States Patent
Breuer et al.

(10) Patent No.: US 10,663,362 B2
(45) Date of Patent: May 26, 2020

(54) METHOD FOR DETERMINING A TORSIONAL MOMENT

(71) Applicant: SIEMENS MOBILITY GMBH, Munich (DE)

(72) Inventors: Werner Breuer, Munich (DE); Minyi Yu, Maisach (DE)

(73) Assignee: Siemens Mobility GmbH, Munich (DE)

( * ) Notice: Subject to any disclaimer, the term of this patent is extended or adjusted under 35 U.S.C. 154(b) by 227 days.

(21) Appl. No.: 15/547,570

(22) PCT Filed: Dec. 10, 2015

(86) PCT No.: PCT/EP2015/079239
§ 371 (c)(1),
(2) Date: Jul. 31, 2017

(87) PCT Pub. No.: WO2016/119964
PCT Pub. Date: Aug. 4, 2016

(65) Prior Publication Data
US 2018/0024017 A1   Jan. 25, 2018

(30) Foreign Application Priority Data

Jan. 30, 2015   (DE) ........................ 10 2015 201 673

(51) Int. Cl.
*G01L 3/04*   (2006.01)
*G01M 17/10*   (2006.01)
(Continued)

(52) U.S. Cl.
CPC ............... *G01L 3/04* (2013.01); *G01M 7/022* (2013.01); *G01M 17/10* (2013.01);
(Continued)

(58) Field of Classification Search
None
See application file for complete search history.

(56) References Cited

U.S. PATENT DOCUMENTS 3,909,501 A   9/1975   Johnsen
4,783,576 A   11/1988   Silver et al.
(Continued)

FOREIGN PATENT DOCUMENTS

DE   2514264 A1   9/1976
DE   10315609 A1   10/2004
(Continued)

OTHER PUBLICATIONS

A. Farshidiianfar, M. Ebrahimi, and H. Bartlett, "Hybrid modelling and simulation of the torsional vibration of vehicle driveline systems" pp. 217-229, 2000. (Year: 2000).*

(Continued)

*Primary Examiner* — Kibrom K Gebresilassie
(74) *Attorney, Agent, or Firm* — Laurence Greenberg; Werner Stemer; Ralph Locher

(57) ABSTRACT

A method for determining a torsional moment of a wheel set shaft of a rail vehicle during the operation of the rail vehicle is used for a wheel set shaft having two wheels secured to ends of the shaft for rolling on two rails. A model is used to calculate a torsional moment which acts on the wheel set shaft, and the model is based on a torsional vibration of the wheel set shaft at a specified slip action point. The torsional moment acting on the wheel set shaft is ascertained based on the energy of the torsional vibration of the wheel set shaft at the slip action point and based on a damping energy which acts on the torsional vibration of the wheel set shaft.

13 Claims, 4 Drawing Sheets

(51) Int. Cl.
*G01M 7/02* (2006.01)
*B60B 17/00* (2006.01)
*B61L 23/04* (2006.01)
*B61L 25/02* (2006.01)
*G06N 7/06* (2006.01)
*B61L 27/00* (2006.01)

(52) U.S. Cl.
CPC ....... *B60B 17/0006* (2013.01); *B60B 2320/00* (2013.01); *B60Y 2200/30* (2013.01); *B61L 23/047* (2013.01); *B61L 25/028* (2013.01); *B61L 27/0027* (2013.01); *G06N 7/06* (2013.01)

(56) References Cited

U.S. PATENT DOCUMENTS

| | | | | |
|---|---|---|---|---|
| 5,579,013 | A | * | 11/1996 | Hershey .............. B61K 9/08 342/357.4 |
| 6,149,544 | A | * | 11/2000 | Masberg .............. B60K 6/26 477/13 |
| 6,405,701 | B1 | * | 6/2002 | Masberg .............. B60K 6/485 123/192.1 |
| 2008/0156944 | A1 | * | 7/2008 | Aurich .............. B60T 8/3235 246/182 C |
| 2012/0028759 | A1 | * | 2/2012 | Tsujimura .............. F16D 48/06 477/175 |
| 2012/0259487 | A1 | * | 10/2012 | Friesen .............. B61F 5/245 701/20 |
| 2016/0010494 | A1 | * | 1/2016 | Erlund .............. G01M 15/14 60/773 |
| 2018/0313426 | A1 | * | 11/2018 | Dieckhoff .............. F16F 15/13157 |

FOREIGN PATENT DOCUMENTS

| | | |
|---|---|---|
| DE | 102012206606 B3 | 10/2013 |
| EP | 2637179 A1 | 9/2013 |
| EP | 2913202 A1 | 9/2015 |
| EP | 2913241 A1 | 9/2015 |

OTHER PUBLICATIONS

A. R. Crowther, N. Zhang, "Torsional finite elements and nonlinear numerical modelling in vehicle powertrain dynamics", pp. 825-849, 2004. (Year: 2004).*

Weber, Franz-Josef, "Auf der Suche nach dem maximalen Radsatzwellen-Torsionsmoment"; ZEVrail; Bd. 138; Sonderheft Tagungsband "42.Tagung Modeme Schienenfahrzeuge der Technischen Universitat Graz; pp. 176-180; ISSN 1618-8330; 2014.

Weber, Franz-Josef, "Auf der Suche nach dem maximalen Radsatzwellen-Torsionsmoment"; Präsentation anlässlich 42. Tagung Moderne Schienenfahrzeuge der Technischen Universität Graz; 2014.

* cited by examiner

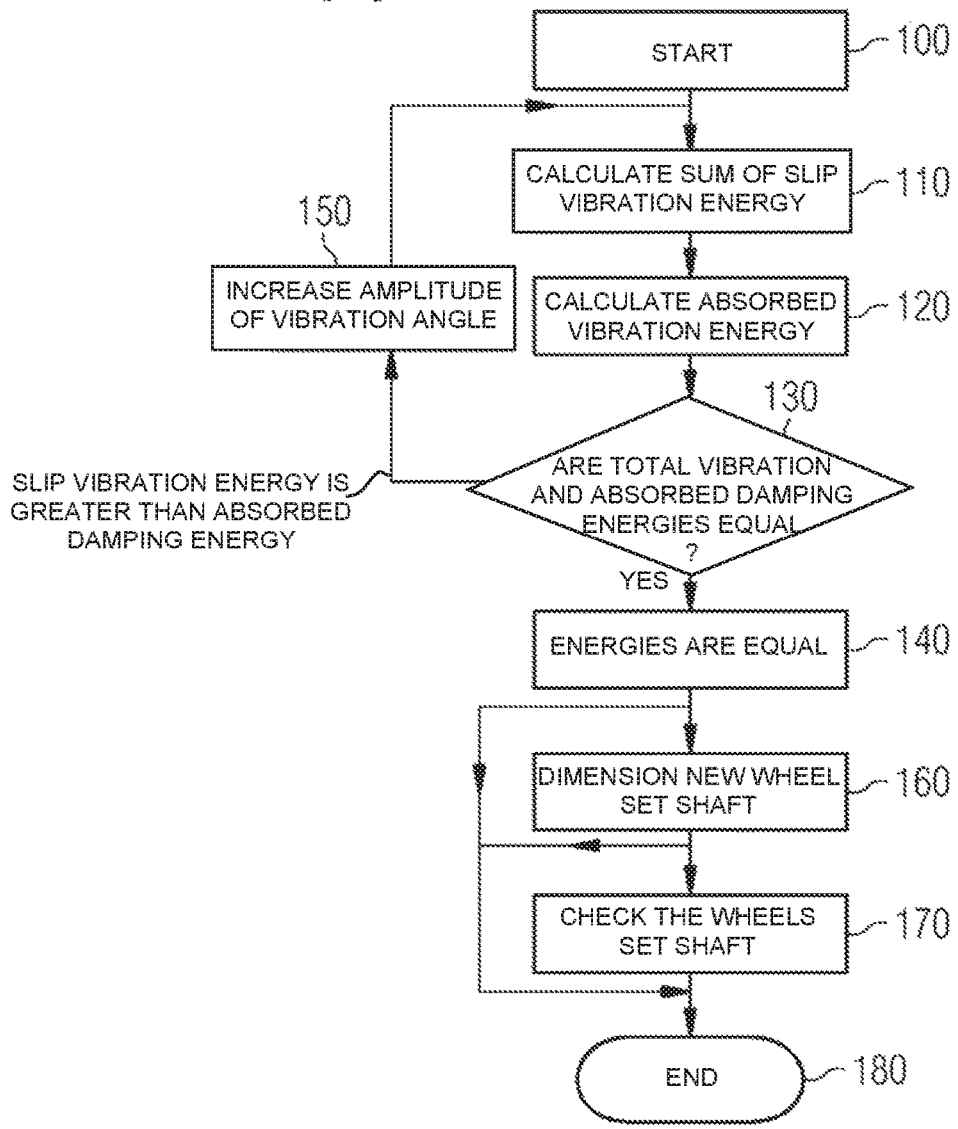
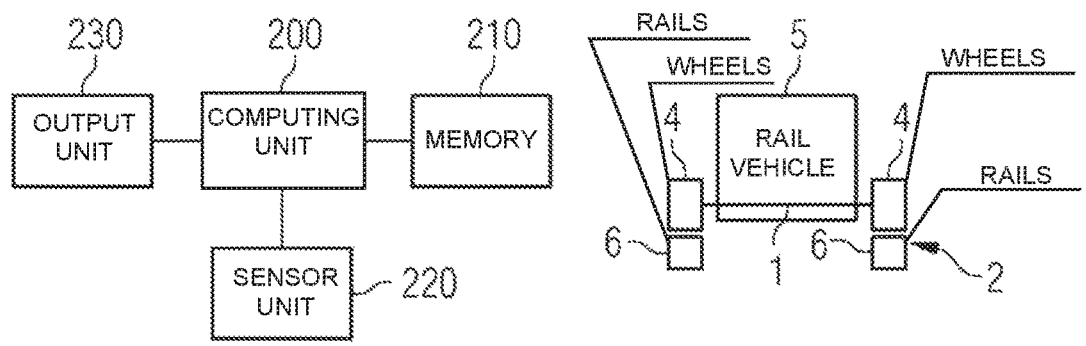

METHOD FOR DETERMINING A TORSIONAL MOMENT

BACKGROUND OF THE INVENTION

Field of the Invention

The invention relates to a method for determining a torsional moment of a wheel set shaft of a rail vehicle during the operation of the rail vehicle.

Measurement of the torsional moment acting on a wheel set shaft of a rail vehicle during operational testing is disclosed in the prior art. However, this procedure is very time-consuming. It is also known that the torsional moment acting on a wheel set shaft of a rail vehicle can be ascertained using a straight line if the running speed is relatively low. Using the straight line, the torsional moment is calculated as a function of the rigidity of the shaft, the running speed, the radius of the wheel and the chatter frequency.

From Franz-Josef WEBER: "Auf der Suche nach dem maximalen Radsatzwellen-Torsionsmoment" ["Searching for the maximum wheel set shaft torsional moment"], in ZEVrail, volume 138, 2014, special conference issue from the 42$^{nd}$ conference on modern rail vehicles at the Technical University of Graz, Sep. 7-10, 2014, pages 176-180 (ISSN 1618-8330), chapter 5 entitled "Das maximale Torsionsmoment" ["The maximum torsional moment"] explains that the self-excited vibration of the wheel set which arises in the decreasing branch of the frictional connection characteristic during operation is not unlimited, and on the contrary a stable threshold frequency occurs. Its maximum amplitude is limited by the energy balance during the threshold frequency, this being influenced by both the non-linear frictional connection/slip characteristic and the damping in the drive train that is generated as a result of loss to the transmission and axle bearing. In a highly simplified approximation, the maximum torsional moment is limited by the running speed at the action point.

From Franz-Josef WEBER: "Auf der Suche nach dem maximalen Radsatzwellen-Torsionsmoment" ["Searching for the maximum wheel set shaft torsional moment"], a presentation at the 42$^{nd}$ conference on modern rail vehicles at the Technical University of Graz, Sep. 7-10, 2014, the torsional vibration of the wheel set is represented by the law of frictional connection. Damping of the torsional vibration is produced by the negative increase in the frictional connection characteristic in the macroslip range. The degree of damping depends on the steepness of the negative increase in the frictional connection characteristic at the slip action point. With sufficient damping, the torsional vibration becomes unstable. A limit cycle occurs in the frictional connection diagram. The maximum amplitude of the limit cycle is determined from the energy balance over a limit cycle.

EP 2 913 241 A1 discloses a method for designing a drive unit for a rail vehicle. For a mechanical construction step, at least one loading value is defined as a function of real adhesion properties of the wheel support, wherein the adhesion properties allow for a slip of the wheel on the rail, and wherein operating data of a reference rail vehicle is taken into account.

EP 2 913 202 A1 discloses a further method for designing a drive unit having a drive and a wheel support, wherein a positive connection between a wheel and a wheel axle is ascertained as a function of loads that occur.

DE 10 2012 206 606 B3 discloses a method for examining torsional vibrations at wheel sets of rail vehicles. A wheel set comprising a wheel set shaft and two wheels is studied in this case, wherein the two wheels run on two running rails. Also provided is a first supporting element for supporting the first wheel and a second supporting element for supporting the second wheel. Also provided is a base which is borne by the first supporting element and the second supporting element. Also provided is a bearing, by means of which the first supporting element is so mounted as to be movable in a longitudinal direction which corresponds to the direction of travel of the wheel sets that are located on the supporting elements. Also provided is drive device, which is combined with the first supporting element and is designed to drive a movement of the first supporting element in the longitudinal direction and thereby excite a mechanical vibration of the first supporting element in the longitudinal direction. Furthermore, the first supporting element is connected to the base via an elastic coupling such that when the first supporting element is deflected, the elastic coupling effects a return force in the longitudinal direction to a position of equilibrium, resulting in the mechanical characteristic.

Franz-Josef et al: "Answers for infrastructure and cities . . . auf der Suche nach dem maximalen Radsatzwellen Torsionsmoment" ["Answers for infrastructure and cities . . . searching for the maximum wheelshaft torsional moment"], Sep. 10, 2014 (2014 Sep. 10), XP055254493, found online: URL:http://www.schienen-fahrzeugtagung.at/download/pdf2014/DiV07-Weber.pdf describes a frictional connection profile as a function of slip for a spinning of the wheelset while disclosing physical equations of motion. Furthermore, the friction for a clattering in wheelset shafts is described as a function of the slip of a wheel. In addition, the torsional vibration in the law of frictional connection as a function of the slip is depicted on the basis of a diagram. Furthermore, measured dynamic torsional moments during variation of the running speed action point are depicted.

SUMMARY OF THE INVENTION

The object of the invention is achieved by a method for determining a torsional moment of a wheel set shaft of a rail vehicle during the operation of the rail vehicle, wherein the wheel set shaft has two wheels secured to ends of the shaft, wherein the wheels are provided for rolling on two rails, wherein a model is used to calculate a torsional moment which acts on the wheel set shaft, wherein the model is based on a torsional vibration of the wheel set shaft at a specified slip action point, and wherein the torsional moment acting on the wheel set shaft is ascertained on the basis of an energy of the torsional vibration of the wheel set shaft at the slip action point and on the basis of a damping energy which acts on the wheel set shaft during the torsional vibration.

Further embodiment variants of the method are specified in the dependent claims.

The described method is advantageous in that the torsional moment acting on a wheel set shaft can be ascertained more accurately than is possible using the straight line. In this case, use is made of a model for a torsional vibration of the wheel set shaft and a damping energy at a specified slip action point. Said model is used to calculate the energy of the torsional vibration and the damping energy which acts on the torsional vibration of the wheel set shaft at the slip action point. The torsional moment acting on the wheel set shaft is ascertained as a function of the torsional vibration energy and the damping energy. It is consequently possible to dispense with resource-intensive test runs. Moreover, the torsional moment is ascertained more accurately in comparison with the straight line.

In an embodiment variant, a first model is used for the energy of the torsional vibration of the wheel set shaft at the slip action point. In addition to this, a second model is used for the damping energy, wherein both models depend on an amplitude of the vibration angle of the torsional vibration of the wheel set shaft. Using a numerical calculating method, the amplitude is progressively increased in both models until the values for the energy are equal at an intersection point of the models. On the basis of the amplitude of the vibration angle, and taking the torsional rigidity of the wheel set shaft into account, a torsional moment is ascertained. By means of this method, it is possible in particular to ascertain a maximum torsional moment.

The determining of the torsional moment is performed for a positive and/or negative acceleration of the rail vehicle. It is therefore possible to ascertain a torsional moment, in particular a maximum torsional moment, for both an acceleration of the rail vehicle and a braking of the rail vehicle.

In a further embodiment, a model for the energy of the torsional vibration is subdivided into at least three ranges. The three ranges differ according to different characteristics of the friction coefficient that occurs between the wheel and the rail. The friction coefficients are described as a function of the slip of the wheels in particular. By subdividing the model into three ranges, it is possible to ascertain the torsional moment more accurately.

In a further embodiment variant, the energy of the torsional vibration during a torsional vibration at the slip action point is calculated for each of the at least three ranges of the model. The three energy components are added together to give an energy of the torsional vibration. In this way, the energy during a torsional vibration at the slip action point is described more accurately.

In a further embodiment variant, the energy of the torsional vibration is calculated as a function of a specified travelling speed range of the rail vehicle. In this case, in particular a maximum energy of the torsional vibration can be calculated for the purpose of ascertaining a maximum torsional moment of rotation of the wheel set shaft. A further improvement of the calculating method is achieved thereby.

In a further embodiment, the energy of the torsional vibration is calculated as a function of a specified angular velocity range. In this case, it is possible to calculate in particular a maximum energy of the torsional vibration for ascertaining a maximum torsional moment of rotation of the wheel set shaft. This provides a further improvement when ascertaining the maximum torsional moment of rotation.

A simple embodiment of the method can be achieved by representing the torsional vibration using a sine wave or a cosine wave. It is easy to calculate the vibration energy in this way.

In a further embodiment variant, a slip of a wheel during a torsional vibration is described as a function of an angular velocity of the torsional vibration. A further simplification of the calculating method is achieved thereby.

In a further embodiment variant, the calculated torsional moment is used to dimension a shaft and/or a connecting structure between the shaft and the wheel, such that the wheel set shaft bears the calculated torsional moment without damage.

In a further embodiment, the ascertained torsional moment is used to check a wheel set shaft, with reference to the thickness of the shaft and/or a strength parameter of the connecting structure, to determine whether the wheel set shaft bears the ascertained torsional moment of rotation without damage.

BRIEF DESCRIPTION OF THE SEVERAL VIEWS OF THE DRAWING

The properties, features and advantages of the invention as described above, and the manner in which these are achieved, become clearer and easier to understand in the context of the following description of the exemplary embodiments, these being explained in greater detail with reference to the drawings, in which:

FIG. 6 shows a schematic illustration of a program sequence for performing the method, and FIG. 7 shows a device for performing the method.

DESCRIPTION OF THE INVENTION

Figure 1:
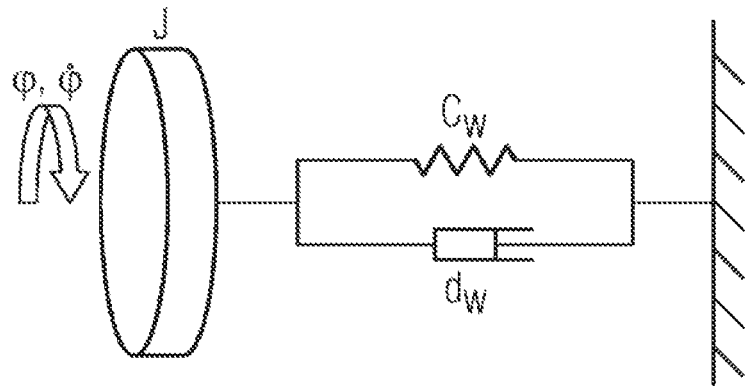
FIG. 1 shows a schematic illustration of a model for an single mass vibrator.

In the context of a design process for dimensioning wheel set shafts or in the context of a checking method for checking wheel set shafts, it important to be able to realistically estimate a magnitude of possible dynamic shaft torsional moments, i.e. torsional moments acting on a wheel set shaft of a rail vehicle, caused by drive train vibrations. In the case of rail vehicles, self-excited torsional vibrations in the wheel set shaft can occur during a driving movement, i.e. when accelerating or braking under unfavorable frictional connection conditions between wheels of the wheel set shaft and rails on which the wheels run. In this case, a form of vibration occurs in which the two wheels vibrate in opposite phase to each other in the torsional resonance frequency of the drive train. As a result of the slight damping in the wheel set shaft, high torsional moments can occur in this way.

This vibration is also referred to as chatter vibration or rolling vibration. Damping equalization of the torsional vibration is produced by the negative increase of the frictional connection characteristic in the macro slip range between the wheel and the rail. The degree of the damping depends on the steepness of the negative increase of the frictional connection characteristic at the slip action point. With sufficient damping equalization, the torsional vibration becomes unstable. A limit cycle appears in the frictional connection diagram. In addition to the damping energy, a maximum amplitude for small slips is limited by a stable branch of the frictional connection characteristic, and a maximum amplitude for large slips is also or exclusively limited by a frictional connection characteristic which becomes flatter. The maximum amplitude of the torsional vibration of the limit cycle is determined from an energy balance over the limit cycle.

The analytical description of the dynamic torsional moment is derived from the kinematic relationship between the slip amplitude and the opposite-phase vibration of the wheels.

The analytical description of the dynamic torsional moment can be derived from the kinematic relationship between the slip amplitude and the opposite-phase vibration of the wheel disks, the straight line:
the slip action point
gives $\Delta v_{chatter} = s \cdot v$
the SIN vibration at
frequency f and $\Delta v_{chatter}$
give a maximum
torsional angle $\Delta \Delta_{chatter}$ $\Delta\Delta_{chatter} = \Delta v_{chatter}/(2\pi r_0 f)$
since wheel set shaft damping
is low, the maximum torsional $M_t = c \cdot \Delta\Delta_{wheel,max}$
moment is given as c torsional rigidity
of the shaft
or the analytical
connection (straight line) as $M_t = c \cdot \Delta v_{chatter}/(2\pi r_0 f)$.

The relationship defined by the straight line is usually used to estimate dynamic torsional moments in the design process.

The proposed analytical method for ascertaining the dynamic torsional moment in wheelBset shafts applies the hypothesis that the dynamic torsional moment can be derived from a limit cycle at the respective slip or slide speed action point. The maximum amplitude of the limit cycle is determined from the energy balance over a limit cycle.

Accordingly, for any frictional connection characteristics, the analytical method calculates the balance over a vibration of the elastic energy in the wheel set shaft and the energy which is produced by the force and the running speed in the wheel/rail contact. The following steps are required for this purpose:

FIG. 1 shows a schematic illustration of a model for a vibration system of the wheel set shaft, wherein J designates the moment of inertia of the wheels, $C_w$ the torsional rigidity of the shaft, and $d_w$ the torsional damping of the wheel set shaft. The moment of inertia, the torsional rigidity and the torsional damping are specified or derived from mechanical parameters including a slip control parameter of the rail vehicle. The slip controller of the rail vehicle is designed such that during acceleration or braking of the rail vehicle, the running speed of the wheels is controlled at a specified slip action point. The slip action point $s_0$ is determined in this way.

The vibration angle $\varphi$ and the vibration angular velocity $\dot{\varphi}$ of the wheel set can be represented by sine and cosine functions:

$$\varphi = A \cdot \sin(\Omega t), \dot{\varphi} = A \cdot \Omega \cos(\Omega t), \quad (1)$$

where $\Omega = 2\pi f$, f being the chatter frequency, and A is the amplitude of the vibration angle $\varphi$.

The chatter frequency f and therefore the angular frequency $\Omega$ are calculated theoretically or ascertained experimentally.

Figure 2:
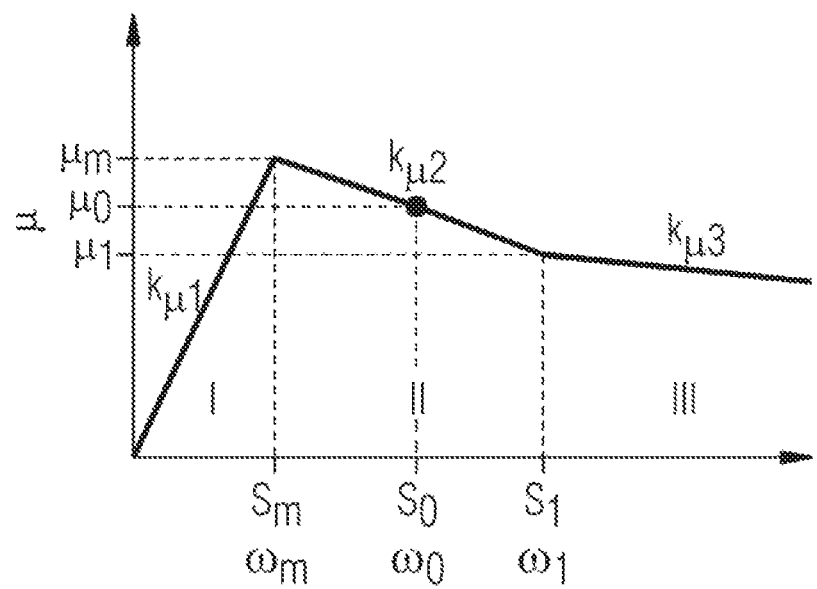
FIG. 2 shows a schematic illustration of a diagram for a friction coefficient as a function of the slip or the rotational wheel speed.

FIG. 2 shows a diagram in which the friction coefficient $\mu$ is plotted over the slip s and the rotational wheel speed w. For simpler illustration, the characteristic of the friction coefficient illustrated in FIG. 2 is subdivided into three ranges I, II, III. Depending on the model used, it is also possible to define a plurality of straight lines for more than three ranges or fewer than three ranges for the approximation of the friction coefficient characteristic.

In a first range I between 0 and $s_m$, the friction coefficient $\mu$ has a positive first rate of increase $k_{\mu 1}$ ($d\mu/ds = k_{\mu 1}$). In a second range II between $s_m$ and $s_1$, the friction coefficient $\mu$ has a negative second rate of increase $k_{\mu 2}$. In the range where the slip is greater than $s_1$, the friction coefficient has a negative third rate of increase $d\mu/ds = k_{\mu 3}$.

In formulaic format, the diagram is as follows:

$$\mu(s) = \begin{cases} \mu_0 + k_{\mu 1} \cdot (s - s_m) + k_{\mu 2} \cdot (s_m - s_0), & 0 \le s < s_m \\ \mu_0 + k_{\mu 2} \cdot (s - s_0), & s_m \le s < s_1 \\ \mu_0 + k_{\mu 3} \cdot (s - s_1) + k_{\mu 2} \cdot (s_1 - s_0), & s_1 \le s < \infty \end{cases} \quad (2)$$

Where $s_0$ is the slip action point ($\approx$reference slip of the slip controller) and $\mu_0$ is the friction coefficient at $s_0$.

Using slip definition, $$s = \frac{\omega_R \cdot R - v_0}{v_0}$$

the rotational wheel speeds can be converted at all vertices in the Illustration 3.2:

$$\omega_m = \frac{(s_m + 1)v_0}{R}; \quad \omega_0 = \frac{(s_0 + 1)v_0}{R}; \quad \omega_1 = \frac{(s_1 + 1)v_0}{R} \quad (3)$$

In (3), $v_0$ is the travelling speed, R is the radius of the wheel and $\omega$ is the rotational wheel speed.

The dynamic slip and the rotation moment at the wheel can be described as a function of the (clatter) vibration speed.

If a wheel set clatters, the (dynamic) slip vibrates at the action point $s_0$. The dynamic slip vibration $\dot{s}$ can be represented as a function of the vibration speed $\dot{\varphi}$:

$$s(\dot{\varphi}) = \frac{(\omega_0 + \dot{\varphi}) \cdot R - v_0}{v_0} = s_0 + \frac{\dot{\varphi} \cdot R}{v_0} \quad (4)$$

If only the clatter vibration is examined, the dynamic rotation moment at the wheel MRS, as generated by tangential force Fx ($=\mu \cdot Q$ with the wheel contact force Q), is derived from the equation (2):

$$M_{RS}(s) = Q \cdot R \cdot \begin{cases} k_{\mu 1} \cdot (s - s_m) + k_{\mu 2} \cdot (s_m - s_0), & 0 \le s < s_m \\ k_{\mu 2} \cdot (s - s_0), & s_m \le s < s_1 \\ k_{\mu 3} \cdot (s - s_1) + k_{\mu 2} \cdot (s_1 - s_0), & s_1 \le s < \infty \end{cases} \quad (5)$$

If the equation (4) is inserted into the equation (5), the dynamic rotation moment at the wheel can likewise be expressed as a function of the vibration speed $\dot{\varphi}$:

$$M_{RS}(s, \dot{\varphi}) = Q \cdot R \cdot \begin{cases} k_{\mu 1} \cdot \frac{R \cdot \dot{\varphi}}{v_0} + (s_0 - s_m) \cdot (k_{\mu 1} - k_{\mu 2}), & 0 \le s < s_m \\ k_{\mu 2} \cdot \frac{R \cdot \dot{\varphi}}{v_0}, & s_m \le s < s_1 \\ k_{\mu 3} \cdot \frac{R \cdot \dot{\varphi}}{v_0} + (s_1 - s_0) \cdot (k_{\mu 2} - k_{\mu 3}), & s_1 \le s < \infty \end{cases} \quad (6)$$

Operational signs and time points of the vibration speed can be described as a function of the frictional connection profile.

By reformatting the equation (4), the vibration speed $\dot{\varphi}$ can be represented as a function of the slip s:

$$\dot{\varphi} = \frac{(s - s_0) \cdot v_0}{R} \quad (7)$$

The equation (7) can be used to ascertain the operational sign of the vibration speed in all slip ranges of the frictional connection profile.

Figure 3:
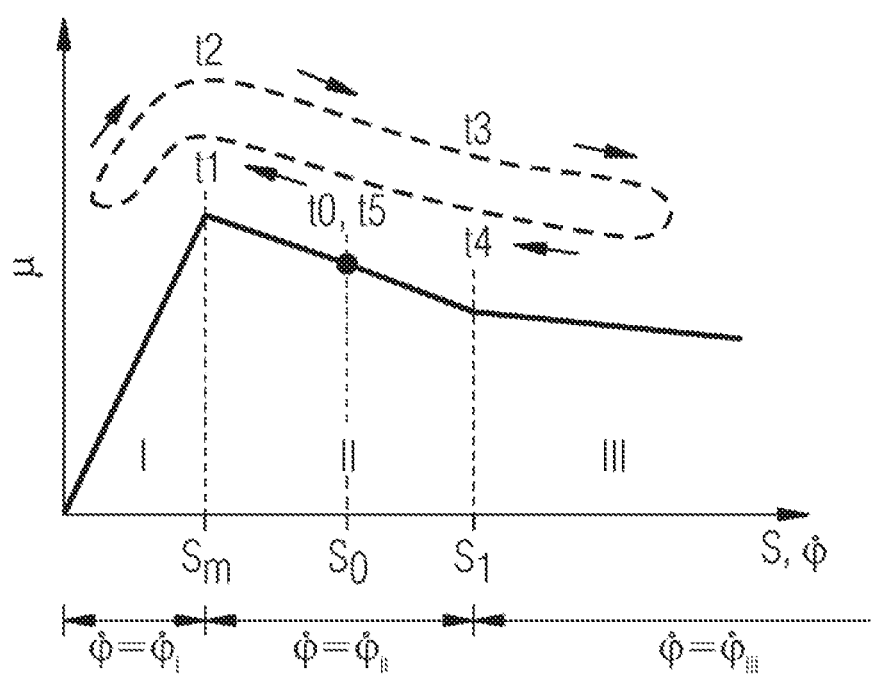
FIG. 3 shows a diagram containing a schematic illustration of a torsional vibration at a slip action point.

Starting from the slip action point $s_0$, the time points at which the slip vibration respectively enters or leaves the first, second and third range are illustrated by means of FIG. 3. FIG. 3 shows a schematic illustration of the profile of the friction coefficient $\mu$ over the slip s and a torsional vibration in a limit cycle as a closed curve represented by a broken line. At the zeroth time point t0, the wheel set shaft is situated at the slip action point $s_0$. Starting from the zeroth time point t0, the slip varies in the direction of smaller values during the torsional vibration, reaching the value $s_m$ at the first time point t1. After this, the slip initially becomes even smaller until it reaches a minimum value, and then increases again. At a second time point t2, the slip reaches the value $s_m$ again. Starting from the second time point t2, the slip increases further, reaching the value $s_1$ at a third time point t3. During the further course of the vibration, the slip increases further until it reaches a maximum value, after which it decreases again. At a subsequent fourth time point t4, the slip reaches the value $s_1$ again. The slip action point $s_0$ is finally reached again at a fifth time point t5.

The value range of the angular velocity $\dot{\varphi}$ is negative in the first range I, changes in the second range II from a negative value to a positive value, and has a positive value in the third range III.

| | In the range I | In the range II | In the range III |
|---|---|---|---|
| Value range of the $\dot{\varphi}$ | $\frac{-s_0 v_0}{R} \leq \dot{\varphi} < \omega_m - \omega_0$ | $\omega_m - \omega_0 \leq \dot{\varphi} < \omega_1 - \omega_0$ | $\omega_1 - \omega_0 \leq \dot{\varphi} < \infty$ |
| Operational sign of the $\dot{\varphi}$ | Negative | From negative to positive | Positive |

Figure 4:
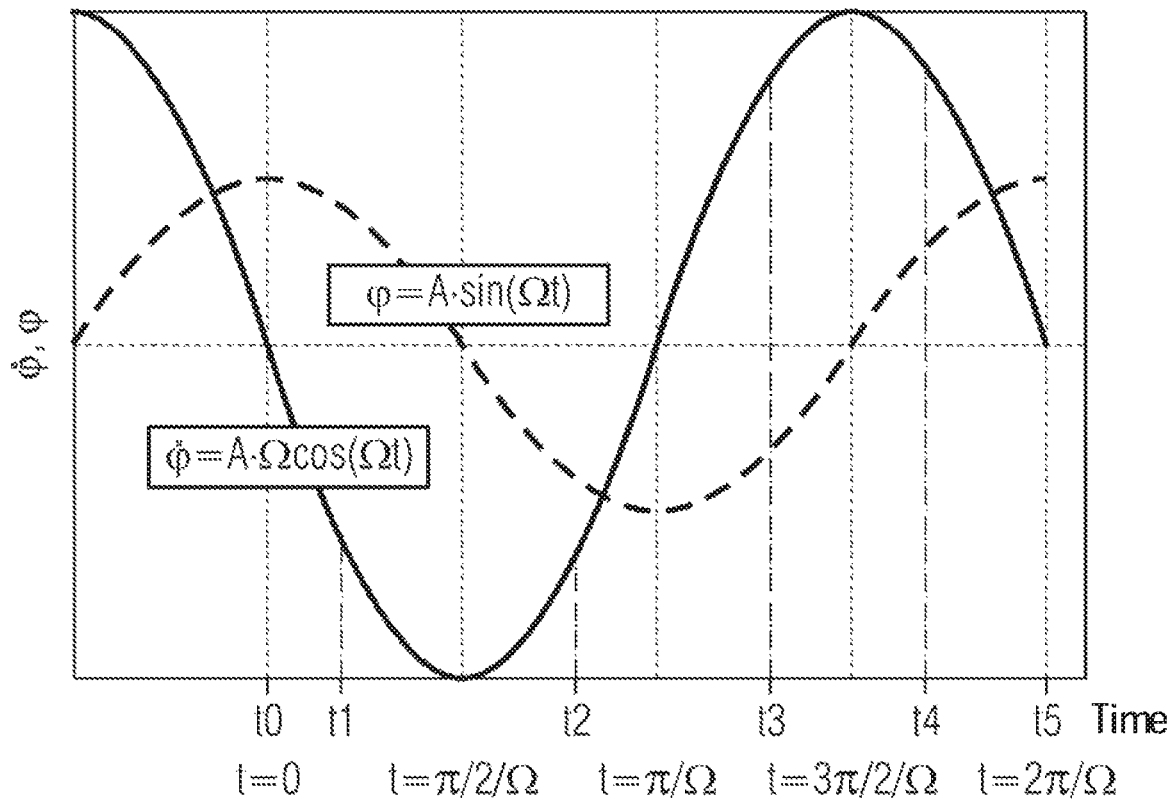
FIG. 4 shows a diagram containing a schematic illustration of a temporal profile of a vibration angle and a vibration angular velocity during a torsional vibration of a wheel set shaft at the slip action point.

FIG. 4 shows a schematic illustration of the vibration angle and the vibration angular velocity $\dot{\varphi}$ for a vibration at the slip action point $s_0$. The vibration angle $\varphi$ can be assumed as a sine wave with the amplitude A and the angular frequency $\Omega$. The vibration angular velocity $\dot{\varphi}$ can be assumed with the amplitude A multiplied by the angular frequency multiplied by a cosine with the angular frequency $\Omega$.

On the basis of the assumptions for the vibration angle and the vibration angular velocity, the time points can be calculated for the zeroth time point t0, the first time point t1, the second time point t2, the third time point t3, the fourth time point t4 and the fifth time point t5 according to the following table:

Temporal profile of the vibration speed in a chatter vibration cycle

| Time point | t0 | t1 | t2 | t3 | t4 | t5 |
|---|---|---|---|---|---|---|
| Time | 0 | $\frac{1}{\Omega}\sin^{-1}\left(\frac{\omega_0 - \omega_m}{A\Omega}\right)$ | $\frac{\pi}{\Omega} - t1$ | $\frac{\pi}{\Omega} + \frac{1}{\Omega}\sin^{-1}\left(\frac{\omega_0 - \omega_m}{A\Omega}\right)$ | $\frac{3\pi}{\Omega} - t3$ | $\frac{2\pi}{\Omega}$ |

On the basis of the model used with the three ranges for the friction coefficient $\mu$, the energy balance for a torsional vibration (clatter vibration) of the wheel set shaft for a vibration cycle can be calculated according to the following formulas:

Energy Balance of the Clatter Vibration in a Vibration Cycle

The vibration energy of the slip vibration $E_\mu$ in a vibration cycle can be calculated in all three ranges of the frictional connection profile.

a) In the range I $$E_{\mu 1} = Q \cdot R \cdot \int_{t1}^{t2} \left(k_{\mu 1} \cdot \frac{R \cdot \dot{\varphi}}{v0} + c_1\right) \cdot \dot{\varphi} \cdot dt \quad (8)$$
$$= A \cdot \Omega \cdot c_1 \cdot Q \cdot R \cdot [\sin(\Omega t)]_{t1}^{t2} +$$
$$\frac{Q \cdot R^2 \cdot k_{\mu 1}}{v_0} A^2 \cdot \Omega^2 \left(\frac{t}{2} + \frac{1}{4\Omega}\sin(2\Omega t)\right)\Big|_{t_1}^{t_2}$$

where $c_1 = (s_0 - s_m) \cdot (k_{\mu 1} - k_{\mu 2})$ b) In the range II $$E_{\mu 2} = Q \cdot R \cdot \int_{t0,t2,t4}^{t1,t3,t5} \left(k_{\mu 2} \cdot \frac{R \cdot \dot{\varphi}}{v0}\right) \cdot \dot{\varphi} \cdot dt \quad (9)$$
$$= \frac{Q \cdot R^2 \cdot k_{\mu 2}}{v_0} A^2 \cdot \Omega^2 \left(\frac{t}{2} + \frac{1}{4\Omega}\sin(2\Omega t)\right)\Big|_{t0,t2,t4}^{t1,t3,t5}$$

c) In the range III $$E_{\mu 3} = Q \cdot R \cdot \int_{t3}^{t4} \left(k_{\mu 3} \cdot \frac{R \cdot \dot{\varphi}}{v0} + d_1\right) \cdot \dot{\varphi} \cdot dt \quad (10)$$
$$= A \cdot \Omega \cdot d_1 \cdot Q \cdot R \cdot [\sin(\Omega t)]_{t3}^{t4} + \frac{Q \cdot R^2 \cdot k_{\mu 3}}{v_0} A^2 \cdot$$
$$\Omega^2 \left(\frac{t}{2} + \frac{1}{4\Omega}\sin(2\Omega t)\right)\Big|_{t3}^{t4}$$

where $d_1 = (s_1 - s_0) \cdot (k_{\mu 2} - k_{\mu 3})$

The total vibration energy is then derived from the slip vibration $$E_\mu = E_{\mu 1} + E_{\mu 2} + E_{\mu 3} \quad (11)$$

The absorbed vibration energy due to the resulting damping can be calculated easily:

$$E_{RS} = d_w \cdot A^2 \cdot \pi \cdot \Omega \quad (12)$$

Finally, the energy component $E_\mu$ and $E_{RS}$ as a function of the amplitude of the vibration angle can be calculated using the equations (8) to (12).

Using a numerical method, it is possible to calculate a maximum value for the torsional moment during a clatter vibration at the slip action point $S_0$ by equating the formula (11) and the formula (12). By progressively increasing the amplitude A, for example, it is possible to increase the total vibration energy and the absorbed vibration energy until the total vibration energy according to formula (11) and the absorbed energy according to formula (12) have equal values.

Figure 5:
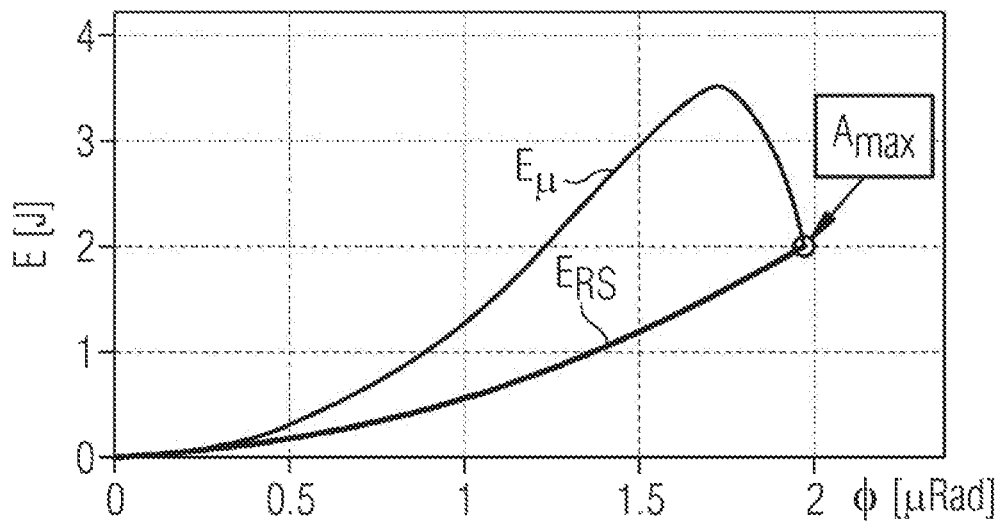
FIG. 5 shows a schematic illustration of a profile of a vibration energy and an absorption energy according to a numerical calculation.

FIG. 5 shows an example of a corresponding numerical calculation. In this case, starting from an amplitude A of the vibration angle having the value 0 for the angular vibration at the slip action point during a clatter vibration, the value of the amplitude A of the vibration angle was progressively numerically increased for both the total vibration energy $E_\mu$ and the absorbed damping energy $E_{RS}$ until, at an amplitude A of 1.95 for the vibration angle, the total vibration energy and the absorbed damping energy are both equal. The amplitude A of the vibration angle can start at an angle of 0.5 µrad, for example, and the value of the amplitude A can be increased in steps of 0.1 µrad.

A correspondence of the total vibration energy and the absorbed vibration energy can also be recognized if the total vibration energy and the absorbed vibration energy differ by less than 5%, in particular by less than 2%.

The value of the maximum vibration angle is therefore situated at this intersection point.

A maximum torsional moment $M_{max}$ for the clatter vibration at the slip action point can be calculated as a function of the maximum vibration angle and the maximum amplitude $A_{max}$ of the vibration angle according to the following formula:

$$M_{max} = A_{max} \cdot c_w,$$

where $A_{max}$ designates the maximum amplitude at the intersection point and $c_w$ designates the torsional rigidity of the wheel set shaft.

FIG. 6 shows a schematic illustration of a program sequence for performing the described method. At a program start point 100, the computing unit reads in the chatter frequency f, the torsional rigidity $c_w$, the torsional damping $d_w$, the values of the friction coefficient for at least one and in particular three different ranges as a function of the slip s or the rotational wheel speed ω, the radius R of a wheel of the wheel set shaft, the travelling speed v0, and a starting value for the amplitude A of the vibration angle from a memory.

At a program point 110 following thereupon, the formulas 8-11 described above are used to calculate the sum of the slip vibration energy $E_\mu = E_{\mu 1} + E_{\mu 2} + E_{\mu 3}$ for a starting value of an amplitude A of the vibration angle. At a program point 120, the absorbed vibration energy due to the resulting damping is then calculated according to the formula (12): $E_{RS} = d_W \cdot A^2 \cdot \pi \cdot \Omega$. The starting value for the amplitude A of the vibration angle is likewise used in this case.

At program point 130, the value of the total vibration energy $E_\mu$ and the value of the absorbed damping energy $E_{RS}$ are then compared with each other. If the total vibration energy and the absorbed damping energy are equal, the program branches to program point 140.

If the result of the comparison at program point 130 indicates that the sum of the slip vibration energy $E_\mu$ is greater than the absorbed damping energy $E_{RS}$, the program branches to program point 150. At program point 150, the value for the amplitude A of the vibration angle is increased by a specified value. The program then branches back to program point 110.

The program steps 110, 120, 130 and 150 are performed until the total vibration energy and the absorbed damping energy are equal and, on the basis of the existing maximum amplitude $A_{max}$ of the vibration angle, a maximum clatter moment $M_{max}$ is calculated in program step 140 using the following formula:

$$M_{max} = A_{max} \cdot c_w.$$

$A_{max}$ corresponds to the amplitude of the vibration angle at which the total vibration energy and the absorbed vibration energy are equal.

Depending on the embodiment variant, it is then possible to branch to the end at program point 180.

In a further embodiment variant, a further program point 160 can optionally be performed after program point 140. At the program point 160, on the basis of the maximum clatter moment calculated at program point 140, a newly designed wheel set shaft is so dimensioned that the shaft and/or the connecting structure between the shaft and the wheel are made in such a way that the wheel set shaft bears the calculated maximum clatter moment without any damage. Depending on the embodiment variant, it is then possible to branch to the end at program point 180.

In a further embodiment, instead of or in addition to the program point 160, a further program point 170 can optionally be performed. The further program point 170 consists in checking with reference to specified values for a wheel set shaft, e.g. the thickness of the shaft, the material of the shaft, the type of connecting structure and in particular at least a strength parameter of the connecting structure, whether a specified wheel set shaft bears the calculated maximum torsional moment without being damaged. Corresponding limit values are defined for this purpose. For example, it is assumed that the wheel set shaft bears the calculated maximum torsional moment without damage if the wheel set shaft is so dimensioned as to withstand at least 120% of the maximum torsional moment without damage.

Those values for the wheel set shaft which are required for the purpose of checking are either captured with reference to a specified wheel set shaft or checked with reference to stored values. In this case, a check is performed in respect of e.g. the thickness of the shaft, the material of the shaft, or a strength parameter of a connecting structure between the shaft and the wheel, in order to determine whether the wheel set shaft is suitable for bearing the calculated torsional moment without damage. Corresponding limit values are defined for this purpose. For example, it is assumed that the wheel set shaft bears the calculated maximum torsional moment without damage if the wheel set shaft is so dimensioned as to withstand at least 120% of the maximum torsional moment without damage.

FIG. 7 shows a schematic illustration of a device for performing the method in which the energy of the torsional vibration is calculated as a function of a specified travelling speed range of the rail vehicle, and wherein in particular a maximum energy of the torsional vibration is used for the purpose of ascertaining a maximum torsional moment of rotation of the wheel set shaft for an intersection point. The device has a computing unit 200 which is connected to a memory 210. The computing unit 200 can also have a sensor unit 220 by means of which it is possible to capture the thickness of a shaft 1 of a wheel set shaft 2 and/or a strength parameter of a connecting structure between the shaft 1 and a wheel 4 of the wheel set shaft 2 of a rail vehicle 5. The wheel set shaft 2 rolls with one wheel 4 on each rail 6. The computing unit 200 can also have an output unit 230 by means of which a result of the method steps of the program points 140, 160 or 170 are displayed. Furthermore, the display 230 can be designed to show a diagram as per FIG. 5, in which the profile of the total vibration energy Eµ and the profile of the absorbed vibration energy ERS are displayed in accordance with the program points 110 and 120.

Although the invention is illustrated and described in detail with reference to the preferred exemplary embodiment, the invention is not restricted by the examples disclosed herein, and other variations may be derived therefrom by a person skilled in the art without thereby departing from the scope of the invention.

The invention claimed is:

1. A method for determining a torsional moment of a wheel set shaft of a rail vehicle during operation of the rail vehicle, the method comprising the following steps:
   providing a wheel set shaft having two ends and two wheels each being secured to a respective one of the ends of the shaft for rolling on a respective one of two rails;
   using a model to calculate a torsional moment acting on the wheel set shaft;
   basing the model on a torsional vibration of the wheel set shaft at a specified slip action point;
   ascertaining the torsional moment acting on the wheel set shaft based on an energy of the torsional vibration of the wheel set shaft at a slip action point and based on a damping energy acting on the wheel set shaft during the torsional vibration;
   using a model for the energy of the torsional vibration of the wheel set shaft at the slip action point and using a model for the damping energy, both models depending on an amplitude of a vibration angle of the torsional vibration;
   starting from a starting value for both models, increasing the amplitude of the vibration angle until both models exhibit an equal value for energy at an intersection point;
   calculating, with a computer, a torsional moment acting on the wheel set shaft based on the amplitude of the torsional vibration at the intersection point and as a function of a specified torsional rigidity of the shaft; and
   displaying, on a display connected to the computer, at least one of: the calculated torsional moment; dimensions for a newly designed wheel set shaft that will bear the calculated torsional moment without damage; or whether a specified wheel set shaft can bear the calculated torsional moment without damage.

2. The method according to claim 1, which further comprises determining the torsional moment for at least one of a positive or negative acceleration of the rail vehicle, and using the specified slip action point for at least one of the positive or negative acceleration as an operating state.

3. The method according to claim 1, which further comprises subdividing the model for the energy of the torsional vibration into at least three ranges having different characteristics of a friction coefficient between the wheel and the rail.

4. The method according to claim 3, wherein the friction coefficients depend on a slip of the wheels.

5. The method according to claim 3, which further comprises calculating the energy of the torsional vibration during a torsional vibration at the slip action point for each of the at least three ranges, and adding three energy components together to give an energy of the torsional vibration.

6. The method according to claim 1, which further comprises calculating the energy of the torsional vibration as a function of a specified travelling speed range of the rail vehicle.

7. The method according to claim 6, which further comprises using a maximum energy of the torsional vibration for ascertaining a maximum torsional moment of rotation of the wheel set shaft for an intersection point.

8. The method according to claim 1, which further comprises calculating the energy of the torsional vibration as a function of a specified angular velocity range.

9. The method according to claim 8, which further comprises using a maximum energy for ascertaining a maximum torsional moment of rotation of the wheel set shaft.

10. The method according to claim 1, which further comprises using a sine wave to ascertain a vibration angle of a torsion of the wheel set shaft.

11. The method according to claim 1, which further comprises taking a slip during a torsional vibration into consideration as a function of an angular velocity of the torsional vibration.

12. The method according to claim 1, which further comprises using a respective mechanical connecting structure to connect each wheel to the shaft, and dimensioning at least one of the shaft or the connecting structure so that the wheel set shaft bears the calculated torsional moment without damage.

13. The method according to claim 1, which further comprises using a respective mechanical connecting structure to connect each wheel to the shaft, capturing at least one of a thickness of the shaft or a strength parameter of the connecting structure to check the wheel set shaft, and performing a check with reference to at least one of the thickness of the shaft or the strength parameter to determine whether the wheel set shaft is suitable for bearing the calculated torsional moment without damage.

* * * * *